L. GOTTSCHALK, DEC'D.
E. J. GOTTSCHALK, ADMINISTRATRIX.
PROCESS OF SYNTHETICALLY PRODUCING RUBBER OR LIKE SUBSTANCE.
APPLICATION FILED MAY 14, 1915.
1,289,444.
Patented Dec. 31, 1918.
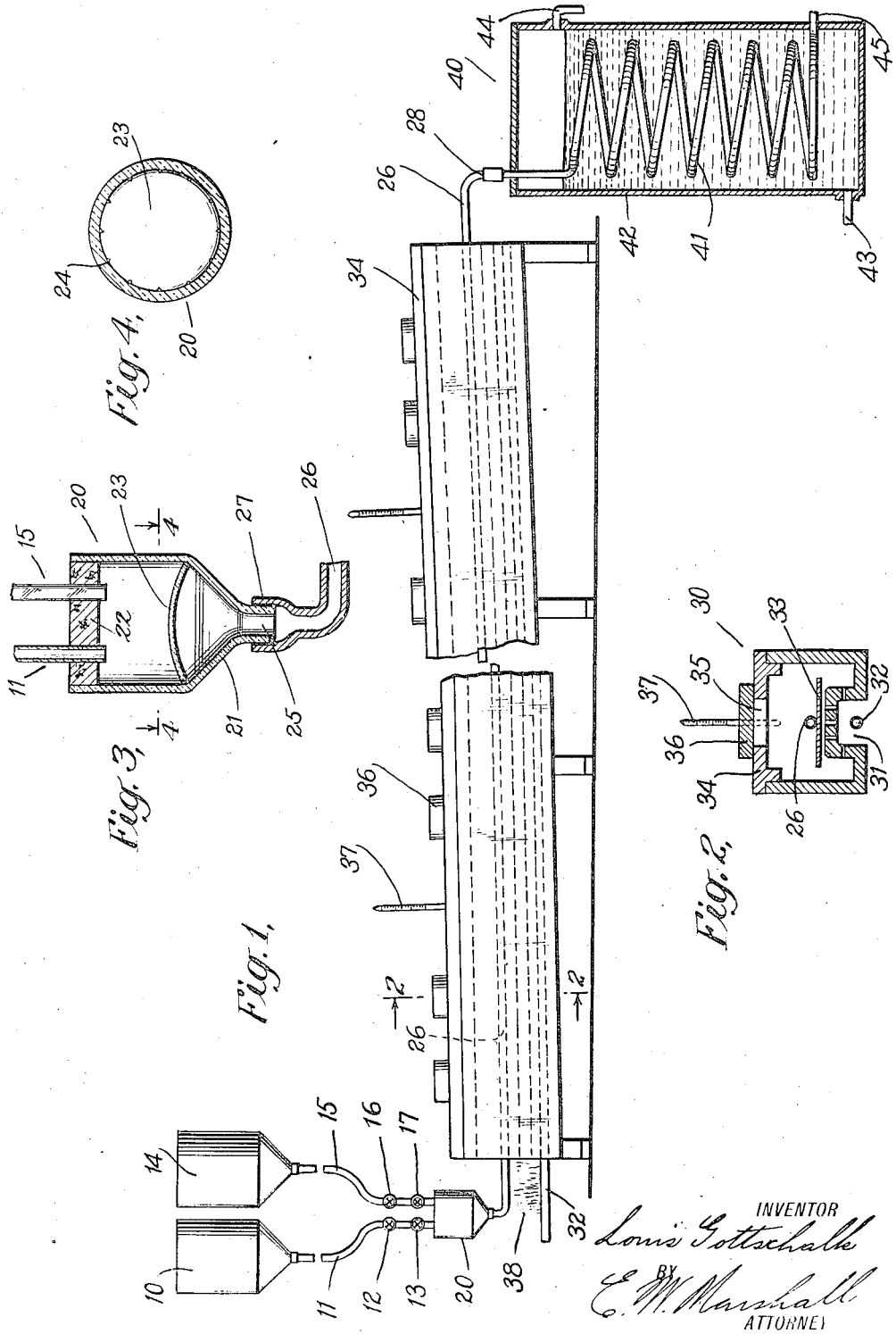
INVENTOR
Louis Gottschalk
BY
E. W. Marshall
ATTORNEY

UNITED STATES PATENT OFFICE.

LOUIS GOTTSCHALK, OF METUCHEN, NEW JERSEY; ESTHER J. GOTTSCHALK, ADMINISTRATRIX OF SAID LOUIS GOTTSCHALK, DECEASED.

PROCESS OF SYNTHETICALLY PRODUCING RUBBER OR LIKE SUBSTANCE.

1,289,444.

Specification of Letters Patent. Patented Dec. 31, 1918.

Application filed May 14, 1915. Serial No. 28,003.

*To all whom it may concern:*

Be it known that I, LOUIS GOTTSCHALK, a citizen of the United States of America, and a resident of Metuchen, Middlesex county, and State of New Jersey, have invented certain new and useful Improvements in Processes of Synthetically Producing Rubber or like Substance, of which the following is a specification, reference being had to the accompanying drawings, forming a part thereof.

My invention relates to improvements in processes of synthetically producing rubber or rubber-like substance, and its object is to provide a simple process by means of which such substances may be produced inexpensively.

I will describe my invention in the following specification and then point out the novel features thereof in appended claims.

Referring to the drawings,

Figure 1 is a more or less diagrammatic elevation, partly in section of an apparatus which is used during a part of my improved process.

Fig. 2 is a transverse section of the oven shown in Fig. 1, the section being taken on the line 2—2 of Fig. 1.

Fig. 3 is a sectional elevation of a vaporizing vessel which is shown in Fig. 1, and Fig. 4 is a sectional plan view of the same vessel, the section in this figure being taken on the line 4—4 of Fig. 3.

Like characters of reference designate corresponding parts in all the figures.

According to this invention a rubber-like substance is made from pinene or from turpentine from which the resin has been removed by steam distillation. The treated turpentine is preferred because it is cheaper. This material is placed in a container 10 which is connected by a tube 11 with a vaporizing vessel 20. In the tube 11 are two valves 12 and 13, one of which is provided for the purpose of turning on and off the supply of liquid from the container 10 to the vaporizing vessel 20, and the other of which is used to regulate or control the rate of flow of this liquid.

14 is another container which serves as a reservoir for a supply of an acid. A tube 15 leads the acid to the vaporizing vessel through a shut-off valve 16 and a regulating valve 17.

The vaporizing vessel which conveniently may be made of glass, is cylindrical for a portion of its length but tapers inwardly at its lower end 21, as shown clearly in Fig. 3. Its upper end is closed by a cork 22 through which the tubes 11 and 15 extend. 23 is an upwardly curved glass disk which lies in the bottom of the cylindrical part of the vessel 20. Around the periphery of this disk are small cuts or nicks 24. The tapered part 21 of vessel 20 ends in a small neck 25.

26 is a metallic tube, one end 27 of which is connected with the neck 25 of the vessel 20. This tube runs through a furnace 30 in an upward incline, and its other end 28 is connected with the pipe coil 41 of a condenser 40.

The furnace 30 is constructed with a groove or channel 31 in its underside, in which channel is a perforated gas pipe 32. The side and top walls of this channel are perforated to allow hot burnt gases access to the inside of the furnace. Between the top wall of channel 31 and the tube 26 is a metallic baffle plate 33. The top of the furnace is closed by a cover 34 in which, at suitable intervals, are apertures 35 which are closed wholly or in part by lids 36. Thermometers 37 are also provided at intervals in the furnace cover 34.

The condenser 40 is of well known form and comprises a pipe coil 41 within a vessel 42 which is adapted to contain a cooling liquid which may be introduced at 43 and discharged at 44. 45 is the discharge end of the pipe coil 41.

In using this invention the turpentine, after the resin has been removed from it, is placed in the container 10, and a suitable acid is placed in the container 14. I prefer to use hydrochloric acid, but am not limited to this as I have found acetic, formic, tannic and nitric acids, and also the other halogen acids, viz., hydrofluoric, hydrobromic and hydriodic acids, or mixtures of any of these acids, to give satisfactory results. The liquids from the two containers are allowed to drip onto the disk 23 in the vaporizing vessel in the proper relative proportions, which are between 5 to 25% of acid to a given amount of prepared turpentine.

A flame 38 from the gas pipe 32 is allowed to play upon the end of pipe 26 which is under the vaporizing vessel and produces enough heat within the lower portion of the vessel to vaporize both the turpentine and the acid. This heat is between 225° and 240° cent. The mixed vapors then pass through the tube 26 which, in the specific installation shown as an illustration, is ⅜" diameter and 16' long. This tube is heated in the oven and the temperature thereof regulated by moving the lids 36 to cover wholly or partly, the different apertures 35. In this manner the heat applied to a given part of tube 26 may be regulated to a nicety.

When the temperature of the combined vapors reaches 250° all of the pinene is changed into limonene, the acid acting as a carrier. This change occurs in the first or lower portion of the tube 26.

Then as the vapors reach a temperature of 300° or over, as they do in the second or higher portion of tube 26, the limonene at least in part is changed into a rubber-like substance, the acid in this case also acting as a carrier.

The vapors are then run through the condenser 40, and emerge therefrom in the form of a very dark liquid product. This product is put in a separator and the acid settles to the bottom. Although it has been discolored and has a dark red color, it can be removed and used over again in a repetition of the same process.

The residue—that is, that portion remaining after the acid has been separated—is a thick, dark-brown liquid, almost black. This is steam-distilled to remove the by-product, that is, the part of the raw material which has not been changed into a rubber-like substance and amounts from 35 to 45% of the raw material. This by-product $(C_{10}H_{16})_n$ has a pleasant odor and can be used commercially as a perfume. Or it may be run through the apparatus again and from 60 to 65% of it will be changed thereby into rubber or like substance. Thus, by repeating the process practically all of the material used, other than the acid, may be changed into rubber or a rubber-like substance.

After distilling with steam, the rubber-like substance is in the form of globules about the size of peas. The water is drained off from the rubber globules and the crude rubber itself is removed by pouring out as much as possible. That portion which clings to the inside of the container is dissolved out with benzin. These combined portions are next placed in open pans and the solvent evaporated. The water is removed by slow heating at 85° cent.

The apparatus shown is illustrative only of one means of practising this invention. I do not intend to limit myself to the use of any particular apparatus, and in fact intend no limitations other than those imposed in the following claims.

What I claim is:

1. The herein described process of making a rubber-like substance by synthesis which comprises heating a mixture of pinene and an acid until the pinene is changed into limonene, raising the temperature of the mixed vapors until the limonene in part is changed into a rubber-like substance, condensing the vapors, and removing the acid.

2. The herein described process of making a rubber-like substance by synthesis which comprises heating a mixture of pinene and an acid until the pinene is changed into limonene, raising the temperature of the mixed vapors until the limonene in part is changed into a rubber-like substance, condensing the vapors, removing the acid, and distilling the by-product from the resultant material.

3. The herein described process of making a rubber-like substance by synthesis which comprises heating a mixture of pinene and an acid until the pinene is changed into limonene, raising the temperature of the mixed vapors until the limonene in part is changed into a rubber-like substance, condensing the vapors, removing the acid, distilling the by-product from the resultant material, and drying the rubber-like substance in the air.

4. The herein described process of making a rubber-like substance by synthesis which comprises vaporizing an acid and a material containing pinene, passing the mixed vapors thus produced through a tube, heating said vapors in a portion of said tube a sufficient amount to cause the pinene to be changed into limonene, increasing the heat of said changed vapors in a subsequent portion of the tube until the limonene in part is changed into a rubber-like substance, condensing the vapors, and removing the acid.

5. The herein described process of making a rubber-like substance by synthesis which comprises vaporizing an acid and a material containing pinene, passing the mixed vapors thus produced through a tube, heating said vapors in a portion of said tube a sufficient amount to cause the pinene to be changed into limonene, increasing the heat of said changed vapors in another portion of the tube until the limonene in part is changed into a rubber-like substance, condensing the vapors, removing the acid, and distilling the by-product from the resultant material.

6. The herein described process of making a rubber-like substance by synthesis which comprises vaporizing an acid and a material containing pinene, passing the mixed vapors thus produced through a tube, heating said vapors in a portion of said tube a sufficient amount to cause the pinene to be changed into limonene, increasing the heat of said changed vapors in another portion of the tube until the limonene in part is changed into a rubber-like substance, condensing the vapors, removing the acid, distilling the by-product from the resultant material, and drying the rubber-like substance in the air.

7. The herein described process of making a rubber-like substance by synthesis which comprises heating together an acid and a material containing pinene, until both are vaporized, passing the mixed vapors thus produced through a tube, heating said vapors in a portion of said tube a sufficient amount to cause the pinene to be changed into limonene, increasing the heat of said changed vapors in another portion of the tube until the limonene in part is changed into a rubber-like substance, condensing the vapors, and removing the acid.

8. The herein described process of making a rubber-like substance by synthesis which comprises heating together an acid and a material containing pinene, to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene to change into limonene, increasing the temperature of said changed vapors in another portion of the tube to a temperature of at least 300° cent. and maintaining said changed vapors at this increased temperature for a sufficient time to allow the limonene at least in part to change into a rubber-like substance, condensing the vapors, and separating and removing the acid.

9. The herein described process of making a rubber-like substance by synthesis which comprises heating together an acid and a material containing pinene, to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene to change into limonene, increasing the temperature of said changed vapors in another portion of the tube to a temperature of at least 300° cent. and maintaining said changed vapors at this increased temperature for a sufficient time to allow the limonene at least in part to change into a rubber-like substance, condensing the vapors, separating and removing the acid, and distilling the by-product from the resultant material.

10. The herein described process of making a rubber-like substance by synthesis which comprises heating together an acid and a material containing pinene, to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene to change into limonene, increasing the temperature of said changed vapors in another portion of the tube to a temperature of at least 300° cent. and maintaining said changed vapors at this increased temperature for a sufficient time to allow the limonene at least in part to change into a rubber-like substance, condensing the vapors, separating and removing the acid, distilling the by-product from the resultant material, and drying the rubber-like substance in the air exposed to a temperature not exceeding 85° cent.

11. The herein described process of making a rubber-like substance by synthesis which comprises removing the resin from commercial turpentine, heating together an acid and said treated turpentine to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene of said turpentine to change into limonene, increasing the temperature of said changed vapors in another portion of the tube to a temperature of at least 300° cent. and maintaining said changed vapors at this increased temperature for a sufficient time to allow the limonene at least in part to change into a rubber-like substance, condensing the vapors, and separating and removing the acid.

12. The herein described process of making a rubber-like substance by synthesis which comprises removing the resin from commercial turpentine, heating together an acid and said treated turpentine to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene of said turpentine to change into limonene, increasing the temperature of said changed vapors in another portion of the tube to a temperature of at least 300° cent. and maintaining said changed vapors at this increased temperature for a sufficient time to allow the limonene, at least in part to change into a rubrer-like substance, condensing the vapors, separating and removing the acid, and distilling from the resultant material, the by-product.

13. The herein described process of making a rubber-like substance by synthesis which comprises removing the resin from commercial turpentine, heating together an acid and said treated turpentine to a temperature not exceeding 240° cent. to vaporize and mix said substances, passing the mixed vapors thus produced through a tube, heating said vapors in a portion of said tube to a temperature of 250° cent. and maintaining the vapors at said temperature for a sufficient time to allow the pinene of said turpentine to change into limonene, increasing the temperature of said changed vapors in another portion of the tube to a temperature of at least 300° cent. and maintaining said changed vapors at this increased temperature for a sufficient time to allow the limonene at least in part to change into a rubber-like substance, condensing the vapors, separating and removing the acid, distilling the by-product from the resultant material, and drying the rubber-like substance in the air exposed to a temperature not exceeding 85° cent.

14. The herein described process of making a rubber-like substance by synthesis which comprises heating a mixture of pinene and an acid until the pinene is changed into limonene, raising the temperature of the mixed vapors thus produced until the limonene at least in part is changed into a rubber-like substance, condensing the vapors, removing the acid, distilling the by-product from the resultant material, and in repeating said process using said removed acid and said by-product.

In witness whereof, I have hereunto set my hand this 12 day of May, 1915.

LOUIS GOTTSCHALK.